United States Patent
Girault et al.

[11] 3,719,764
[45] March 6, 1973

[54] DRUGS DERIVED FROM PYRAZOLONE

[75] Inventors: Pierre Girault, Paris; Guy Hagemann, Nogent Sur Marne, both of France

[73] Assignee: Roussel Uclof, Paris, France

[22] Filed: July 27, 1971

[21] Appl. No.: 166,564

[30] Foreign Application Priority Data

Aug. 14, 1970 France..............................7030026

[52] U.S. Cl...................................424/273, 424/273
[51] Int. Cl. .................................A61k 27/00
[58] Field of Search......................424/273

[56] References Cited

UNITED STATES PATENTS 2,899,443  8/1959  Schulze ............................260/310 A
3,006,759  10/1961  Loria et al. ......................260/310 A

FOREIGN PATENTS OR APPLICATIONS 6,707,544  11/1967  Netherlands ....................260/310 A

OTHER PUBLICATIONS

R. Westoo, Acta. Chem. Scand., Vol. 6, Part 2, pp. 1499–1515 (1952).
S. Wiley et al., Pyrazolones, Pyrazolidines and Dev., pp. 81–83 and 344–345, N.Y. Interscience Wiley 1964.

*Primary Examiner*—Jerome D. Goldberg
*Attorney*—Hammond & Littell

[57] ABSTRACT

According to the invention the 3-amino-4,4 dichloro pyrazolone of formula I

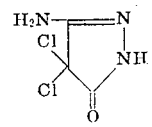

and its salts with a therapeutically compatible mineral or organic acid are pharmaceutically useful compounds. They are endowed with interesting antibacterial and antifungic properties.

2 Claims, No Drawings

DRUGS DERIVED FROM PYRAZOLONE

STATE OF THE ART

The compound of formula I has been described in the U.S. copending Patent application Ser. No. 871 959 filed Oct. 28, 1969, now U.S. Pat. 3,646,058. This Patent application describes the process of preparation of the compound of formula I and teaches that the said compound possesses antibacterial activity useful in agriculture and biocidal activity in the industrial field.

Nevertheless the compound of the invention possesses also a pharmaceutical activity.

OBJECT OF THE INVENTION

The compound of formula I and its salts with a therapeutically compatible mineral or organic acid have interesting pharmaceutical properties including use as antibacterial and antifungic.

THE INVENTION

The invention concerns 3 amino 4,4-dichloro 5 pyrazolone of formula I

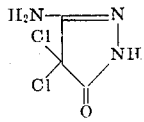

and its salts with a therapeutically compatible mineral or organic acid.

These compounds are endowed with interesting antibacterial and antifungic properties, which can be used in therapeutics. They are suitable for use more particularly in treating staphylococcal infections such as, cutaneous staphylococcal infection, pyodermatitis, septic and suppurating sores, anthrax, phlegmon, erysipelas, (and) acute, primary or post-influenza staphylococcal infections.

Their antifungic properties enable them to be used in cases of cutaneous and fungic dermatosis, mycosis of the foot, mycotic intertrigo, mycotic eczema, mycotic vaginitis, impetigo, pyodermatitis, eczematiform dermatitis, epidermomycosis, dysidrosis, onychomycosis.

These compounds are used by local route in a topical application on the skin and the mucous membranes.

They can be in the form of powders, creams, ointments, aerosol preparations, lotions, solutions, suspensions, powders or granules for extemporaneous preparations, collyria, ophthalmic preparations, nasal drops, ear drops. These forms, for pharmaceutical use, are prepared according to the usual processes.

These compounds can also form part of the composition of preparations for cosmetic use, particularly creams and hygiene products.

The useful concentrations of these compounds in a topical application on the skin or the mucous membranes, range from 0.1 to 2 percent.

Preparation of 3-amino 4,4-dichloro 5-pyrazolone is described in the U.S. copending Patent application, Ser. No. 871,959. It consists essentially in that one causes chlorine gas to react with 3-amino 5-pyrazolone in an acetic acid medium.

EXAMPLE

Preparation of 3-amino 4,4-dichloro 5-pyrazolone

Into 300 c.c. of acetic acid, one introduces 100 g of 3-amino 5-pyrazolone, then causes 150 g. of chlorine gas to bubble into the reaction mixture while agitating for an hour at ambient temperature. One isolates the precipitate formed by suction-filtering, washes it with water, dries it and obtains 143 g. of 3-amino 4,4-dichloro 5-pyrazolone, M.p. = 220°–222° C (with decomposition).

A sample of this product is crystallized from methanol, M.p. = 220°–222° C (with decomposition). Pharmacological study of 3-amino 4,4-dichloro 5-pyrazolone
I/ Antifungic activity in vitro
  A. Activity in a liquid medium The minimum inhibitory concentration was determined in an Oxoid liquid Sabouraud medium on *Candida albicans*. After 24 hours, it is 150 $\mu$g/ml.

B. Activity by a diffusion in a gelled medium:

An Oxoid dextrose agar gelled Sabouraud medium (pH = 5.6) is injected with the micro-organism under study. One cuts cupules 1 cm. in diameter out of this medium, and one incorporates the product under study into the cavities thus obtained in the form of an ointment at 1 percent. The controls receive only the excipient from the ointment. One incubates and then measures the areas of inhibition.

The excipient of the washable ointment is made up of a mixture of fatty alcohols saturated at $C_{20}$, double sulphate of ketostearylic alcohol and of sodium; a mixture of equal parts of ketylic and stearylic alcohols, propylene glycol, phenylmercuric nitrate and distilled water.

The fungus under study is *Candida albicans*.

The diameter of the areas of inhibition is 2.3 cm., both after 48 hours' incubation and after 24 hours'. The activity of the product is thus stable over this period.

II/ Antibacterial activity in vitro
  A. Activity in a liquid medium

The minimum inhibitory concentrations (M.I.C.) were determined in a liquid medium with respect to various bacterial strains, after 24 and 48 hours' incubation at 37° C. The results obtained are summarized in the following tables:

| Gram+ micro-organisms | M.I.C. 24 hours | 48 hours |
|---|---|---|
| Oxford staphylococcus aureus | 5 $\mu$g/ml | 10 $\mu$g/ml |
| Clinical staphylococcus aureus | 5 " | 20 " |
| Streptococcus hemolyticus | 20 " | 40 " |
| Bacillus subtilis | 5 " | 10 " |

| Gram- micro-organisms | M.I.C. 24 hours | 48 hours |
|---|---|---|
| Escherichia coli | 2 $\mu$g/ml | 5 $\mu$g/ml |
| Pathogenic escherichia coli | 5 " | 10 " |
| Klebsiella pneumoniae | 5 " | 20 " |
| Salmonella typhimurium | 2 " | 5 " |
| Proteus mirabilis | 2 " | 20 " |
| Pseudomonas pyocyanea | 5 " | 20 " |

B. Activity by a diffusion in a gelled medium
  The method used is comparable to that of I, B.

The medium used is the "oxoid agar-based D.S.T." gelled medium at pH = 7.4. The product under study is incorporated in the form of the aforesaid ointment.

The results obtained are summarized in the following table:

| Strains of clinical origin | Diameter of the areas of inhibition | |
|---|---|---|
| | 24 hours | 48 hours |
| Staphylococcus aureus (2 strains) | 4.4 cm | 4.2 cm |
| Bacillus subtilis | 5.5 " | 5.4 " |
| Escherichia coli (2 strains) | 3.9 " | 3.9 " |
| Klebsiella pneumoniae | 3.8 " | 3.8 " |
| Proteus mirabilis | 3.8 " | 3.8 " |
| Pseudomonas aeruginosa | 4.7 " | 4.7 " |

These results show that the ointment used diffused well and exerts a good inhibitory activity against Gram+ and Gram− bacteria. The activity is stable over the period of time, given that the areas of inhibition observed after 48 hours— incubation are identical to those observed after only 24 hours.

III/ Cutaneous tolerance 3-amino 4,4-dichloro 5-pyrazolone was applied in the form of the aforesaid ointment at 1 percent on a surface of about 24 to 28 sq.cm., once a day for 20 days, to the skin of four male white rats (after careful depilation and rough scraping with no. 000 emery paper until bleeding occurs) whose average weight was 140 g. The animals were weighed every four days. Over the whole duration of the experiment, the rats kept up an excellent general condition and put on weight with great regularity (no anomaly in the weight curve). Regrowth of the hair was normal, no local intolerance was observed, and, in the autopsy, no macroscopically-visible damage to the organs was discovered. This preparation is thus well tolerated in a prolonged local application.

IV/ Toxicity

The lethal 50 dose (per os) in the rat is 750 mg/kg.

Conclusion

The product under study has a good antibacterial activity over a broad spectrum, with respect to Gram+ and Gram−pathogenic micro-organisms. In the form of a washable ointment containing 1 percent active principle, the inhibitory action by diffusion with respect to various bacteria is very satisfactory and stable over the period (bactericidal action). The product is well tolerated, in the form of an ointment at 1 %, by the skin of the rat, in repeated applications, and it is scarcely toxic per os.

Examples of preparations made with a bas of 3-amino
 Formulas
 Dermic ointment

| | |
|---|---|
| 3-amino 4,4-dichloro 5-pyrazolone | 0.75 g |
| distilled water | 4.50 g |
| thick Vaseline oil Codex | 2.38 g |
| polysorbate 80 | 0.42 g |
| propylene glycol Codex | 26.60 g |
| zinc stearate | 5.90 g |
| Vaseline | 9.85 g |
| sodium metabisulphite | 0.50 g |
| disodium tetracemate | 0.10 g |
| cholesterol | 0.70 g |
| acetylmethylamine | q.s. for 100 g |

Dermic cream

| | |
|---|---|
| 3-amino 4,4-dichloro 5-pyrazolone | 0.400 g |
| fatty alcohol saturated at $C_{20}$ marketed under the name of Eutahol G | 10.000 g |
| double sulphate of ketostearylic alcohol and of sodium marketed under the name of Lanette E | 0.300 g |
| mixture of equal parts of ketylic and stearylic alcohols marketed under the name of Excipient GM 946 | 3.700 g |
| phenylmercuric nitrate | 0.002 g |
| propylene glycol | 10.000 g |
| sodium metabisulphite | 0.500 g |
| tris-(hydroxymethyl) amino methane | 0.100 g |
| distilled water | q.s. for 100.000 g |

Ear drops

| | |
|---|---|
| 3-amino 4,4-dichloro 5-pyrazolone | 0.40 g |
| trisodium ethylene diamine tetra-acetate | 0.10 g |
| sodium metabisulphite | 0.50 g |
| glycerine | 10.00 g |
| distilled water | 10.00 g |
| propylene glycol Codex | q.s. for 100.00 g |

Aerosol preparation

| | |
|---|---|
| 3-amino 4,4-dichloro 5-pyrazolone | 1.00 g |
| zinc stearate | 0.60 g |
| perhydrosqualene | 3.50 g |
| disodium tetracemate | 0.10 g |
| liquified propellant gases | q.s for 50 ml |

Collyrium

| | |
|---|---|
| 3-amino 4,4-dichloro 5-pyrazolone | 0.500 g |
| polyethylene glycol 4,000 | 10.000 g |
| lithium chloride | 0.300 g |
| citric acid | 0.020 g |
| trisodium citrate | 0.200 g |
| phenylmercuric nitrate | 0.001 g |
| benzyl alcohol | 0.030 g |
| trisodiumethylene diamine tetra-acetate | 0.050 g |
| sodium metabisulphite | 0.500 g |
| injectable distilled water Codex | q.s. for 100 g |

Nasal drops

| | |
|---|---|
| 3-amino 4,4-dichloro 5-pyrazolone | 0.500 g |
| benzyl alcohol | 0.300 g |
| polysorbate 80 | 0.100 g |
| carboxymethylcellulose (sodium salt) | 0.500 g |
| sodium chloride | 0.800 g |
| phenylmercuric nitrate | 0.002 g |
| sodium metabisulphite | 0.500 g |
| disodium tetracemate | 0.100 g |
| distilled water | q.s. for 100.00 g |

Solution for local application

| | |
|---|---|
| 3-amino 4,4-dichloro 5-pyrazolone | 0.500 g |
| tris-(hydroxymethyl) amino methane | 0.100 g |
| sodium metabisulphite | 0.500 g |
| isotonic solution of sodium chloride | q.s. for 100 g |

Gingival paste

| | |
|---|---|
| 3-amino 4,4-dichloro 5-pyrazolone | 0.20 g |
| medicinal soap | 0.20 g |
| tricalcium phosphate | 0.15 g |
| propylene glycol Codex | 10.00 g |
| glycerine | 10.00 g |
| saccharine | 0.01 g |
| oil of mint | 0.04 g |
| sodium metabisulphite | 0.05 g |
| disodium tetracemate | 0.100 g |
| calcium carbonate | 100 g |

We claim

1. A method of treating fungal and bacterial infections on the skin and mucous membranes comprising applying topically to an animal's skin or mucous membrane an effective amount for treating fungal and bacterial infections of an active member of the group consisting of 3-amino-4,4-dichloro-5-pyrazolone and its non-toxic, pharmaceutically acceptable acid addition salts.

2. The method of claim 1 wherein the active member is 3-amino-4,4-dichloro-5-pyrazolone.

* * * * *